United States Patent
Trede

(10) Patent No.: US 10,781,798 B2
(45) Date of Patent: Sep. 22, 2020

(54) NACELLE COMPONENT FOR A WIND TURBINE AND METHOD FOR MOUNTING A NACELLE COMPONENT

(71) Applicant: SENVION GmbH, Hamburg (DE)

(72) Inventor: Alf Trede, Immenstedt (DE)

(73) Assignee: Senvion GmbH, Hamburg (DE)

( * ) Notice: Subject to any disclaimer, the term of this patent is extended or adjusted under 35 U.S.C. 154(b) by 0 days.

(21) Appl. No.: 15/983,192

(22) Filed: May 18, 2018

(65) Prior Publication Data

US 2018/0335023 A1 Nov. 22, 2018

(30) Foreign Application Priority Data

May 18, 2017 (DE) .......................... 10 2017 004 800

(51) Int. Cl.
| | | |
|---|---|---|
| *F03D 80/80* | (2016.01) | |
| *F03D 13/10* | (2016.01) | |
| *F03D 9/25* | (2016.01) | |
| *F03D 13/20* | (2016.01) | |
| *F03D 80/50* | (2016.01) | |
| *F03D 80/00* | (2016.01) | |

(52) U.S. Cl.
CPC .............. *F03D 80/85* (2016.05); *F03D 9/25* (2016.05); *F03D 13/10* (2016.05); *F03D 13/20* (2016.05); *F03D 80/00* (2016.05); *F03D 80/50* (2016.05); *F03D 80/80* (2016.05); *F05B 2240/14* (2013.01); *F05B 2240/916* (2013.01)

(58) Field of Classification Search
CPC . F03D 80/85; F03D 9/25; F03D 13/10; F03D 13/20; F03D 80/00; F03D 80/50; F03D 80/80

USPC ........... 290/44, 55; 416/170 R, 204 R, 244 R
See application file for complete search history.

(56) References Cited

U.S. PATENT DOCUMENTS

| | | | |
|---|---|---|---|
| 8,147,183 B2* | 4/2012 | Madge | F03D 15/00 415/124.1 |
| 9,041,236 B2* | 5/2015 | Larsen | F03D 80/82 290/55 |
| 2003/0071469 A1* | 4/2003 | Becker | F03D 13/20 290/55 |
| 2009/0129931 A1* | 5/2009 | Stiesdal | F03D 13/10 416/204 R |

(Continued)

FOREIGN PATENT DOCUMENTS

| | | |
|---|---|---|
| EP | 2161445 A1 | 3/2010 |
| EP | 2573387 A1 | 3/2013 |
| WO | 2016116112 A1 | 7/2016 |

OTHER PUBLICATIONS

Search Report dated Apr. 5, 2018 for German Priority Application No. 102017004800.2.

*Primary Examiner* — Viet P Nguyen
(74) *Attorney, Agent, or Firm* — Alix, Yale & Ristas, LLP

(57) ABSTRACT

A nacelle component for a nacelle of a wind turbine, comprising a mainframe module and a power electronics module. The mainframe module and the power electronics module in each case have a length greater than a width. In the assembled state of the nacelle component, the mainframe module is oriented with its longitudinal axis parallel to a vertical plane which extends through the axis of a rotor shaft. The longitudinal axis of the power electronics module intersects the vertical plane which extends through the axis of the rotor shaft. A method for mounting such a nacelle component is also disclosed.

18 Claims, 9 Drawing Sheets

(56) References Cited

U.S. PATENT DOCUMENTS

| | | | |
|---|---|---|---|
| 2010/0034658 A1* | 2/2010 | Numajiri | F03D 13/10 416/204 R |
| 2010/0052330 A1* | 3/2010 | Rasmusen | H02K 1/02 290/55 |
| 2012/0141292 A1* | 6/2012 | Signore | B66C 1/108 416/244 R |
| 2012/0146337 A1* | 6/2012 | Castell Martinez | F03D 15/20 290/55 |
| 2012/0255291 A1* | 10/2012 | Kameda | F03C 1/26 60/398 |
| 2013/0234443 A1* | 9/2013 | Casazza | E04G 21/14 290/55 |
| 2013/0302144 A1* | 11/2013 | Demtroder | H02K 7/1838 415/124.2 |
| 2015/0123403 A1* | 5/2015 | Casazza | H02K 7/003 290/44 |
| 2016/0258424 A1* | 9/2016 | Nielsen | F03D 80/40 |
| 2017/0363071 A1* | 12/2017 | Baun | F03D 80/82 |
| 2018/0069442 A1* | 3/2018 | Ma | H02K 7/1838 |

* cited by examiner

NACELLE COMPONENT FOR A WIND TURBINE AND METHOD FOR MOUNTING A NACELLE COMPONENT

BACKGROUND

The disclosure relates to a nacelle component for a wind turbine, and a method for mounting a nacelle component.

In wind turbines, a nacelle is usually arranged rotatably on a tower. The nacelle carries a rotor which is connected to a generator via a rotor shaft. The rotor is set in rotation by the wind and drives the generator such that electrical energy is generated. The rotor can be oriented in the direction of the wind by rotating the nacelle relative to the tower.

As output increases, the components of wind turbines become larger and heavier, as a result of which the complexity in terms of transportation and erecting wind turbines rises. It is known from WO 2016/116112 A1, EP 2 573 387 A1 for a nacelle to be composed of a plurality of modules. The individual modules can be transported from the manufacturing plant to the site where the wind turbine is erected with a manageable degree of complexity. However, there is a certain degree of complexity involved in erecting the wind turbine when the nacelle has to be assembled from a relatively large number of modules.

SUMMARY OF THE INVENTION

An object of the invention is to provide a nacelle component and a method for mounting a nacelle component, by means of which both the complexity of transportation and also the complexity when erecting the wind turbine can be minimized.

A nacelle component according to aspects of the disclosure comprises a mainframe module and a power electronics module. The mainframe module has a width and a length greater than said width. The power electronics module has a width and a length greater than said width. In an assembled state of a disclosed nacelle component, the mainframe module is oriented with its longitudinal extent parallel to the rotational axis of the rotor shaft. In the assembled state, the longitudinal axis of the power electronics module intersects with a vertical plane which extends parallel to the rotor shaft axis. The assembled state refers to the state in which the power electronics module is connected as intended to the mainframe module.

The available space can be used effectively by the two modules being arranged in the nacelle component with different orientations, as a result of which the nacelle can be assembled from a reduced number of modules. The dimensions of the modules are nevertheless still such that they can be readily transported. A favorable load distribution can moreover be achieved owing to the transversely arranged power electronics module because the components arranged on the power electronics module have a reduced distance from the axis of rotation of the nacelle. The load torque can consequently be reduced.

The mainframe module and/or the power electronics module can have a rectangular shape or a shape approximating a rectangle with respect to the plane defined by the length and the width. In the case of a rectangle, the length refers to the longer of the two axes, and the width to the shorter of the two axes. If the mainframe module and/or the power electronics module have a shape other than a rectangle, the length and the width according to the invention refer to the smallest rectangle within which the relevant module can be enclosed.

In the assembled state of the nacelle component, the transverse extent of the mainframe module can be oriented horizontally. The longitudinal extent of the mainframe module can be extend parallel to the rotor shaft axis. The longitudinal extent of the power electronics module can extend in a horizontal direction and be oriented at right angles to the rotor shaft axis. The transverse extent of the power electronics module can extend parallel to the rotor shaft axis. The transverse extent of the mainframe module and the longitudinal extent of the power electronics module are preferably parallel to each other. The transverse extent of the power electronics module can be arranged as a continuation of the longitudinal extent of the mainframe module.

The mainframe module can comprise a mounting for a rotor shaft. The direction of the rotor shaft axis can be defined by the mounting. The mounting can in particular be designed such that the rotor shaft extends, in the mounted state, parallel to the longitudinal extent of the mainframe module. The mounting can have bearing blocks to which one or more bearings for the rotor shaft can be attached. It is also possible for the mainframe module to be placed in a pre-mounted state in which a rotor shaft is carried by the mainframe module and is mounted so that it can rotate via bearings relative to the mainframe module.

The mainframe module can comprise a mounting for a gearbox. The mounting for the gearbox can be separate from the mounting for the rotor shaft. It is also possible for the mainframe module to comprise a common mounting which holds the rotor shaft and the gearbox. The mainframe module can be placed in a pre-mounted state in which the rotor shaft is mounted so that it can rotate relative to the mainframe module and the gearbox is attached in a fixed position relative to the mainframe module. The rotor shaft can be connected to the low-speed shaft of the gearbox. The high-speed shaft can be arranged at an opposite end of the gearbox and extend parallel to the longitudinal extent of the mainframe module. A rotor hub can be attached at the other end of the rotor shaft. The rotor hub can have a plurality of connections for rotor blades, in particular three connections for rotor blades.

The nacelle component according to the invention may comprise a gearbox. The gearbox may be connected to the mainframe module and/or to the power electronics module by means of a gearbox mounting. Between the gearbox and the gearbox mounting, there may be arranged a torque support which counteracts a rotation of the gearbox relative to the gearbox mounting. The torque support may comprise a gearbox rib which is rigidly connected to the gearbox mounting. Between the gearbox rib and the gearbox body, there may be arranged a multiplicity of suspension elements, in particular at least three suspension elements, preferably at least five suspension elements, more preferably at least ten suspension elements. The suspension elements may be elastic, and may in particular be designed so as to permit an elastic compensation movement between the gearbox rib and the gearbox body if a high torque acts on the low-speed gearbox shaft. There may be a plane which is perpendicular to the low-speed gearbox shaft and which intersects the suspension elements of the torque support. One or more or all of the suspension elements may comprise a bearing bolt. The bearing bolt may extend parallel to the rotor shaft. The bearing bolt may be rigidly connected to the gearbox rib or to the gearbox body, whereas the connection between the bearing bolt and the respective other element is of elastic design. For example, around the bearing bolt, there may be arranged an elastic material which can be compressed as a result of a movement of the gearbox body relative to the gearbox rib. The suspension elements may be arranged in a ring-shaped manner around the low-speed shaft of the gearbox; in other words, the torque support may comprise a multiplicity of suspension elements that are arranged with a corresponding spacing to the low-speed shaft of the gearbox. The suspension elements may be arranged in an evenly distributed manner over the circumference of the low-speed gearbox shaft. It is also possible for the suspension elements to not be arranged in an evenly distributed manner over the circumference of the low-speed gearbox shaft. In one embodiment, the torque support comprises a first circumferential section, which is equipped with suspension elements, and a second circumferential section, which is free from suspension elements. The first circumferential section may for example extend over a circumferential angle between 180° and 270°. The second circumferential section may for example extend over a circumferential angle of between 90° and 180°. Within the first circumferential section, the suspension elements may be distributed evenly over the circumference. A gearbox with a torque support that has one or more of the stated features has independent inventive substance even if the gearbox is not used in the context of a nacelle component according to the invention. By means of a torque support of said type, the gearbox can be designed to be narrower in a transverse direction than in the case of a conventional torque support which comprises two arms projecting in a transverse direction. This may be advantageous if an exchange of the gearbox becomes necessary. For example, a compact gearbox can be pulled into the power electronics module along the longitudinal axis of the mainframe module and lowered from there to the foot of the tower.

In one embodiment of the nacelle component according to the invention, a generator may be flange-mounted onto the high-speed shaft of the gearbox, wherein the generator may, in the mounted state, be situated in the mainframe module; the mainframe module may have a dedicated mounting for the generator, a mounting for the unit composed of generator and gearbox, or a common mounting for generator, gearbox and rotor shaft. The mainframe module may be placed in a pre-mounted state by virtue of the rotor shaft being mounted rotatably relative to the mainframe module and, via the gearbox, being connected to the generator which is attached in a fixed position relative to the mainframe module.

The mainframe module can comprise a slewing ring via which the mainframe module can be connected to a tower of a wind turbine. The axis of the slewing ring can coincide with an axis of rotation about which the mainframe module, or a nacelle in which the mainframe module is accommodated, can be rotated relative to the tower. The axis of rotation can correspond to a center axis of the tower. The slewing ring can be designed as a connection for a bearing such that one bearing ring can be connected to the slewing ring and the other bearing ring can be connected to the upper end of the tower. The mainframe module can be rotated relative to the tower by rotation of the bearing. The bearing can be connected to the mainframe module in a pre-mounted state.

In one embodiment of the nacelle component according to the invention, the power electronics module can comprise a mounting for a generator. The power electronics module can be placed into a pre-mounted state in which the generator is connected to the power electronics module. In the pre-mounted state, the power electronics module and the mainframe module are not yet connected to each other. The generator can be arranged such that an input shaft of the generator extends parallel to the transverse extent of the power electronics module. The input shaft of the generator can be arranged non-centrally in the power electronics module such that, relative to the longitudinal extent of the power electronics module, the distance from one end of the power electronics module is smaller than the distance from the opposite end of the power electronics module. Viewed from the generator toward the input shaft, the distance from the right-hand end of the power electronics module can thus be smaller than the distance from the left-hand end of the power electronics module. The power electronics module can be placed in a pre-mounted state in which the generator is connected to the power electronics module. The generator can extend over at least 40%, preferably at least 60%, and more preferably at least 80% of the transverse extent of the power electronics module.

The power electronics module can be equipped with a mounting for a converter. The power electronics module can be placed in a pre-mounted state in which a converter is connected to the power electronics module. An electrical connection between the converter and the generator can be produced such that it is possible to test the fault-free interaction between the converter and the generator (functional test). The converter can be spaced apart from the generator with respect to the longitudinal extent of the power electronics module. The converter can overlap the generator with respect to the transverse extent of the power electronics module. If the generator is arranged non-centrally in the power electronics module, the converter can be arranged in the larger of the two part sections of the power electronics module which are defined by the generator.

The power electronics module can have a mounting for a transformer. The power electronics module can be placed in a pre-mounted state in which a transformer is connected to the power electronics module. An electrical connection between the transformer and the converter can be produced such that it is possible to test the fault-free interaction between the transformer, the converter, and/or the generator.

A medium-voltage cable which is designed to transmit the electricity generated by the generator to the power grid is connected to the transformer. In the assembled state of the nacelle component, the medium-voltage cable can pass via the mainframe module toward a tower of the wind turbine.

The transformer can be spaced apart from the generator with respect to the longitudinal extent of the power electronics module. The transformer can overlap the generator with respect to the transverse extent of the power electronics module. If the generator is arranged non-centrally in the power electronics module, the transformer can be arranged in the smaller of the two part sections of the power electronics module which are formed by the generator.

The power electronics module can comprise a mounting for one or more switch cabinets. The power electronics module can be placed in a pre-mounted state in which one or more switch cabinets are connected to the power electronics module. A control unit for the generator, the converter, and/or the transformer can be arranged in the switch cabinets. An electrical connection between the control unit, the generator, the converter, and/or the transformer can be produced such that it is possible to test the fault-free interaction of the components concerned.

The switch cabinet or cabinets can be spaced apart from the generator with respect to the longitudinal extent of the power electronics module. The switch cabinets can overlap with the generator with respect to the transverse extent of the power electronics module. If the generator is arranged non-centrally in the power electronics module, the switch cabinets can be arranged in the larger of the two part sections of the power electronics module which are formed by the generator. The switch cabinets can be spaced apart from the converter with respect to the transverse extent of the power electronics module. The switch cabinets can overlap with the converter with respect to the longitudinal extent of the power electronics module.

The power electronics module can be equipped with a cooling system. The cooling system can be designed so as to cool the generator, the transformer, and/or the converter. It is also possible for the cooling system to be designed so as to cool the gearbox. In the operating state of the nacelle, a pipe can extend between the power electronics module and the mainframe module via which a cooling medium is exchanged between the cooling system and the gearbox.

The power electronics module can comprise a central frame which extends only over a part of the longitudinal extent of the power electronics module. A side frame can be attached to one side or both sides of the central frame such that the central frame and the side frames extend in total over the longitudinal extent of the power electronics module. The central frame can be designed so that it is solid and can hold heavier components of the power electronics module. The generator, for example, may belong to the heavy components. The side frames can have a less solid design than the central frame and can hold lighter components of the power electronics module. The converter, the transformer, and/or the switch cabinets can belong to the lighter components.

The power electronics module may comprise a frame part, within which there is formed a downwardly open aperture. The aperture may be dimensioned and arranged such that components of a nacelle arranged on a tower of a wind turbine can be lowered downward through the aperture, for example for the purposes of maintenance or repair. These may for example be components which, during the operation of the wind turbine, are connected to the mainframe module and/or to the power electronics module. The frame part may fully enclose the aperture. Also possible is a frame part which only partially encloses the aperture. The frame part may comprise a first main member and a second main member, wherein the main members between them enclose the aperture. The main members may extend in a transverse direction of the power electronics module. In relation to the longitudinal direction of the power electronics module, the aperture may be arranged between the main members. In one embodiment, the frame part corresponds to the central member of the power electronics module. A power electronics module with a frame part with one or more of these features has independent inventive substance even if the power electronics module does not have further features of the nacelle component according to the invention.

The power electronics module may comprise a component carrier. The component carrier may comprise mountings for elements of the power electronics module; in particular, the component carrier may comprise mountings for the generator and/or the transformer. The component carrier may be connected to the frame part of the power electronics module. The fastening between the component carrier and the frame part may be detachable. A power electronics module having a component carrier of said type has independent inventive substance even if the power electronics module does not have further features of the nacelle component according to the invention.

In the connected state, the component carrier may be arranged below the frame part. Components connected to the component carrier may project into the aperture of the frame part. The component carrier may be larger than the aperture, such that components connected to the component carrier are arranged laterally adjacent to the aperture if the component carrier is connected to the frame part. A component of the power electronics module that is held by the component carrier may rest on the component carrier and/or be fastened to the component carrier. Furthermore, the component may be fastened to the frame part, to a side frame or to other elements of the power electronics module.

The power electronics module may be placed in a pre-mounted state by virtue of the component carrier being connected to the frame part and by virtue of one or more components of the power electronics module being connected to the component carrier. Alternatively, the component carrier may also be connected to the frame part of the power electronics module, or separated again from the frame part of the power electronics module, at any desired later stage of the assembly process. The component carrier may be configured such that, when equipped with the elements, held by the component carrier, of the power electronics module, said component carrier can be moved using a lifting apparatus; for this purpose, the component carrier may have lifting devices, for example in the form of eyelets, diverting rollers and/or winches. Alternatively or in addition, the component carrier may be designed to be lifted using a lifting platform; for this purpose, the component carrier may for example have a flat underside for stable support on the lifting platform and/or may, at the edges, be compatible with container corners or twist locks, whereby a firm connection to a suitable lifting platform is made possible. The component carrier according to the invention facilitates the maneuvering of elements of the power electronics module between the nacelle installed on the tower and the ground, whereby an exchange of components or repair of components on the ground are facilitated.

In the form of an independent invention, the present disclosure furthermore relates to a system for lowering a wind turbine component from the nacelle to the ground. The system comprises a lifting platform with a lifting travel that extends between the nacelle arranged on the tower and the ground. The lifting platform may be an element of the nacelle or a separate part. During the lifting process, the lifting platform may be suspended on one or more cables which are suitably taken in or let out, for example by rotation of one or more winches. In one embodiment, the drive for taking in or letting out the cables is connected to the lifting platform. When the lifting platform is standing on the ground, the cable can be taken in from the nacelle while the drive is in a freewheeling state. If one end of the cable is connected to the nacelle, the lifting platform can be lifted by actuation of the drive. When the lifting platform has been brought up to the nacelle, one or more components of the nacelle can be placed onto the lifting platform and can be lowered again using the lifting platform. It is also possible for the drive of the lifting platform to be an element of the nacelle.

In one embodiment, the lifting platform corresponds to the component carrier of the power electronics module. The component carrier can be detached from the frame part of the power electronics module and lowered, together with the components fastened thereto, as lifting platform.

If the lifting platform is a separate part, this can be brought to the component carrier of the power electronics module from below. As soon as the component carrier is supported from below by the lifting platform, the component carrier can be detached from the frame part and lowered downward using the lifting platform. To prevent the component carrier from slipping relative to the lifting platform, a connecting means may be provided between the component carrier and the lifting platform, for example in the form of container corners/twist locks such as are known from ISO containers.

The system may comprise a service crane. For this purpose, the service crane may be designed to be installed on a frame; in particular, the service crane may be designed to be installed on the component carrier or on the lifting platform. The service crane can have compact dimensions; it is preferably possible for the service crane to be transported as a whole, and in a ready-for-use state, in an ISO container. The service crane may be designed to lift relatively large loads; a relatively large load may for example be the gearbox or the generator. The service crane can be utilized to move the gearbox and/or the generator from an operating position within the nacelle into a position in which the component can be lowered out of the nacelle.

The system may have an auxiliary lifting apparatus, wherein the auxiliary lifting apparatus may be designed for the raising and lowering of relatively small loads between the nacelle component installed on the tower and the ground. A relatively small load may for example be the cables of the winches of the lifting platform. The auxiliary lifting apparatus may for example be an on-board crane or a winch. The mainframe module or preferably the power electronics module may comprise a mounting for the auxiliary lifting apparatus. The mainframe module or the power electronics module may be placed in a pre-mounted state by virtue of the auxiliary lifting apparatus being connected to the mainframe module or to the power electronics module. As an example for the use of the system, the lowering of a component out of the nacelle of the wind turbine is described in each case. Correspondingly, the system can be utilized in order to raise a component from the ground to the nacelle and install said component there. The invention furthermore relates to corresponding methods for lowering a component out of the nacelle of a wind turbine and for raising a component to the nacelle of a wind turbine. The power electronics module and/or the mainframe module may comprise housings, wherein the housings protect the components of the power electronics module and/or of the mainframe module for example against environmental influences. The housing of the power electronics module may be self-supporting. This may mean in particular that a lateral housing part extends between an upper end and a lower end without being supported over the area by a skeletal frame. Frame struts of the power electronics module may extend along the upper, lower and/or lateral ends of the housing part. Along its edges, the housing part may be connected to the frame struts. The self-supporting design saves space and weight. A power electronics module having a housing of said type has independent inventive substance even if the power electronics module is not used in the context of a nacelle component according to the invention.

The housing of the power electronics module may be manufactured from an electrically conductive material and/or from a material with good thermal conductivity. In particular, the housing may be manufactured at least in sections from sheet metal. Owing to the electrical conductivity, the housing can act as a Faraday cage, whereby improved lightning protection is provided. Owing to good thermal conductivity, the housing can be integrated into the existing cooling system; the walls of the power electronics module can for example be utilized as a cooling element. The walls of the power electronics module may for example be composed of trapezoidal sheet, such as is known from the construction of an ISO container. The walls may exhibit sufficient stability that relatively small elements of the power electronics module can be suspended directly on a wall. The roof of the power electronics module may be composed of multiple segments, wherein individual segments are mounted in displaceable fashion such that access into the interior of the power electronics module can be opened up from above; alternatively, individual segments of the roof or the entire roof are/is designed to be removable. The power electronics module and/or the mainframe module can be placed in a pre-mounted state by virtue of parts of the housings or the entire housing being fixedly connected to the power electronics module and/or to the mainframe module. A power electronics module with a housing which has one or more of these features has independent inventive substance even if the power electronics module does not have further features of the nacelle component according to the invention.

In the assembled state in which the mainframe module and the power electronics module are connected to each other, the central frame of the power electronics module can extend as a continuation of a frame element of the mainframe module. The frame element of the mainframe module preferably extends parallel to the longitudinal extent of the mainframe module.

The mainframe module can comprise a connection device for establishing a connection with the power electronics module. The connection device can comprise, for example, stud bolts or bores through which the bolts can pass. The connection device can be arranged on a transverse side of the mainframe module, in particular on that transverse side which is remote from the rotor.

The power electronics module can comprise a connection device for establishing a connection to the mainframe module. The connection device can comprise, for example, bores which are arranged so that they match bores or stud bolts of the mainframe module. Also possible are stud bolts which are arranged so that they match bores of the mainframe module. The connection device can be arranged on a longitudinal side of the power electronics module, in particular on that longitudinal side facing the input shaft of the gearbox. When the connection between the mainframe module and the power electronics module is established, the input shaft of the generator can be connected to the high-speed shaft of the gearbox. The input shaft of the generator can, in the assembled state, be oriented coaxially with the high-speed shaft of the gearbox.

The connection device between the mainframe module and the power electronics module can be designed such that the mainframe module is fastened centrally on the longitudinal side of the power electronics module. The connection device between the mainframe module and the power electronics module is preferably designed to be stable such that the mainframe module and the power electronics module can be raised or moved in the assembled state as a unit. The mainframe module and/or the power electronics module can comprise suspension devices, for example in the form of eyelets by means of which the mainframe module and the power electronics module can be maneuvered as a unit.

The mainframe module and/or the power electronics module may be equipped with a rail system which is designed for moving a component of the nacelle, the connection of which to the mainframe module or to the power electronics module is released in a maintenance state, relative to the mainframe module and/or to the power electronics module. The rail system may comprise a section connected to the mainframe module and/or a section connected to the power electronics module. The rail system can be utilized for moving a component, which during operation of the wind turbine is connected to the mainframe module, in the direction of the power electronics module. From the power electronics module, the component can be lowered for the purposes of maintenance or repair. Such a method may be expedient in particular for lowering a generator and/or a gearbox out of the nacelle of the wind turbine. The gearbox and the generator can be moved separately from one another by means of the rail system. It is also possible for the gearbox and the generator to be moved together as a unit by means of the rail system. A nacelle of a wind turbine which is equipped with a rail system with one or more of these features has independent inventive substance even if the nacelle does not have further features of the invention. The invention also relates to a maintenance method in which a component of a wind turbine is initially moved in a substantially horizontal direction within the nacelle and is then lowered out of the nacelle. The substantially horizontal movement may be performed using a rail system of said type. A path provided in the power electronics module for the lowering of a component of the nacelle can in this way also be used for components which, during the operation of the wind turbine, are connected to the mainframe module. In the context of the disclosure, the expression "lowering" encompasses both a transport path in the case of which the component is removed from the nacelle through the base and a transport path in the case of which the component is removed from the nacelle through a side wall and also a transport path in the case of which the component is removed from the nacelle through the ceiling.

The transverse extent of the mainframe module can be smaller than the longitudinal extent of the power electronics module. The mainframe module and the power electronics module can have similar dimensions with respect to the transverse extent. The transverse extent of the power electronics module can in particular deviate from the transverse extent of the mainframe module by less than 50%, preferably less than 20%, and more preferably less than 10%.

The transverse extent of the mainframe module and/or the transverse extent of the power electronics module can, for example, lie between 2 m and 6 m, preferably between 3 m and 5 m, and more preferably between 3.5 m and 4.5 m. Transportation by road with an acceptable degree of complexity is still possible with a transverse extent of this magnitude. The longitudinal extent of the mainframe module and/or the longitudinal extent of the power electronics module can, for example, lie between 120% and 400%, preferably between 150% and 300%, of the transverse extent of the relevant module. The height of the mainframe module and/or the power electronics module is preferably no greater than 4 m. The longitudinal axis of the power electronics module can, in the assembled state, enclose a right angle with the longitudinal axis of the mainframe module.

The invention also relates to a nacelle which comprises such a nacelle component. A rotor can be connected to the rotor shaft of the nacelle component. The nacelle can be provided with a housing surrounding the mainframe module and the power electronics module.

The disclosure moreover relates to a wind turbine in which such a nacelle is arranged rotatably on a tower. An azimuth bearing can be arranged between the mainframe module of the nacelle and the tower. The azimuth bearing can be connected to the slewing ring of the mainframe module. A medium-voltage cable can extend from the power electronics module via the mainframe module and through the tower as far as the base of the tower. The electricity generated by the generator can be transmitted to the power grid via the medium-voltage cable. The wind turbine can have a capacity of at least 2 MW. The wind turbine can be designed for onshore operation.

The invention moreover relates to a method for mounting a nacelle component of a wind turbine. In the method, a mainframe module and a power electronics module are transported to a mounting site. During transportation, the mainframe module and/or the power electronics module are oriented lengthwise, i.e. the direction of movement during transportation is parallel to the longitudinal extent of the mainframe module or the power electronics module. At the mounting site, the mainframe module and the power electronics module are furthermore connected to each other such that a transverse end of the mainframe module abuts a longitudinal side of the power electronics module. The method may be further developed with further features that are described in conjunction with the nacelle component according to the invention. The nacelle component may be further developed with further features that are described in conjunction with this method.

The mainframe module and/or the power electronics module can be in a pre-mounted state during transportation. Before establishing the connection to the mainframe module, the power electronics module can be subjected to a functional test, in which the fault-free interaction between the generator, the converter, the transformer, and/or a control unit belonging to these components is tested.

The invention also relates to an erection system for a wind turbine, in the case of which a multiplicity of wind turbine components are fastened to an upper end of a tower. The erection system comprises a first erection state, in which a first wind turbine component and a second wind turbine component are connected to form a first transport unit, and a third wind turbine component is an element of a second transport unit. In a second erection state, the first wind turbine component and the third wind turbine component are connected to form a third transport unit, wherein the second wind turbine component is either likewise an element of the third transport unit or is an element of a fourth transport unit. Either the first erection state or the second erection state is produced on the ground. Depending on the selection of the erection state, the erection of the wind turbine is performed either by raising the first transport unit and the second transport unit to the upper end of the tower or by raising the third transport unit and the fourth transport unit to the upper end of the tower.

An erection state may involve more than two transport units. A transport unit may comprise more than two wind turbine components.

In an exemplary first erection state, the first transport unit is composed of the mainframe. The second transport unit is formed by the drive train (rotor shaft plus gearbox). A third transport unit is formed by the power electronics module with the generator, the converter and/or further electrical components. A fourth transport unit may form the rotor (rotor plus rotor hub). Alternatively, the rotor hub and the rotor blades may each form individual transport units. These two possibilities for the rotor assembly apply correspondingly to the following erection states.

In an exemplary second erection state, the nacelle, composed of the mainframe and the power electronics module (with generator, converter and/or further electrical components), forms a first transport unit. The drive train forms a second transport unit. Further transport units may comprise the rotor either in its entirety or in individual components.

In an exemplary third erection state, the first transport unit is composed of the mainframe. The second transport unit is composed of the drive train without gearbox. The third transport unit is composed of the gearbox. The fourth transport unit is composed of the power electronics module (with generator, converter and/or further electrical components). Further transport units may comprise the rotor either in its entirety or in individual components.

In an exemplary fourth erection state, the first transport unit is composed of the mainframe, including drive train and housing. The second transport unit is composed of the power electronics module (with generator, converter and/or further electrical components). Further transport units may comprise the rotor either in its entirety or in individual components.

In an exemplary fifth erection state, the first transport unit is composed of the nacelle including mainframe, power electronics module (with generator, converter and/or further electrical components) and housing. Further transport units may comprise the rotor either in its entirety or in individual components.

In an exemplary sixth erection state, the first transport unit is composed of the nacelle including mainframe, power electronics module (with generator, converter and/or further electrical components), housing and rotor hub. Further transport units may comprise individual components of the rotor.

The sequence in which the transport units are transported to the top of the tower may correspond to the sequence in which the transport units are listed in the context of the abovementioned erection states. A sequence that differs therefrom is also possible during the lifting of the transport units. The invention comprises variations within the stated transport units. For example, it is possible in each case for elements of the housing to be optionally added to a first transport unit or to a second transport unit.

Each transport unit may have one or more lifting points. The articulation points may be arranged so as to enclose the center of gravity of the transport unit between them, such that stable lifting of the transport unit is possible.

Depending on the conditions at the location of erection of the wind turbine and on the availability of working means such as cranes etc., the wind turbine components may be placed in one of the erection states on the ground. Thus, with the erection system according to the invention, a large number of possibilities are provided as regards how an individual wind turbine can be erected.

The disclosure also relates to a method for attaching a multiplicity of wind turbine components to an upper end of a tower of a wind turbine. In a first step, a first erection state is selected from a multiplicity of available erection states. The wind turbine components are placed in the first erection state on the ground. A first transport unit and a second transport unit are raised to the upper end of the tower, wherein each transport unit comprises one or more wind turbine components. The method may be further developed with further features that are described in conjunction with the erection state according to the invention. The erection system may be further developed with further features that are described in conjunction with this method.

BRIEF DESCRIPTION OF THE DRAWINGS

The invention is described by way of example below, with the aid of advantageous embodiments, with reference to the attached drawings, in which.

DETAILED DESCRIPTION

Figure 1:
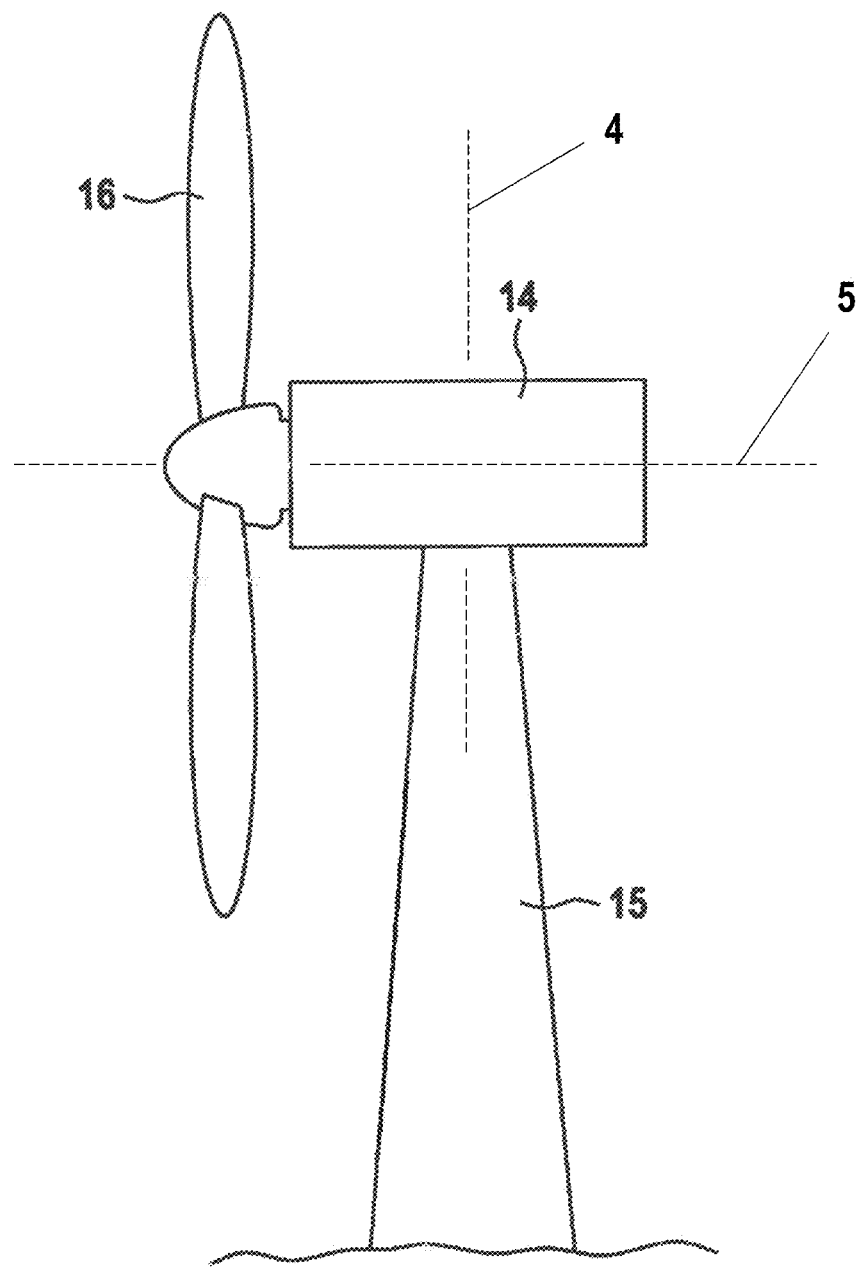
FIG. 1 shows a schematic view of a wind turbine according to aspects of the disclosure.

In a wind turbine according to aspects of the disclosure shown in FIG. 1, a nacelle 14 is mounted on a tower 15 to rotate about a nacelle axis of rotation 4. A rotor 6 is set in rotation about a rotational axis 5 by the wind and drives a generator 23 via a gearbox 22. The generator 23 generates electricity which is fed into a power grid via a converter 24 and a transformer 25.

Figure 2:
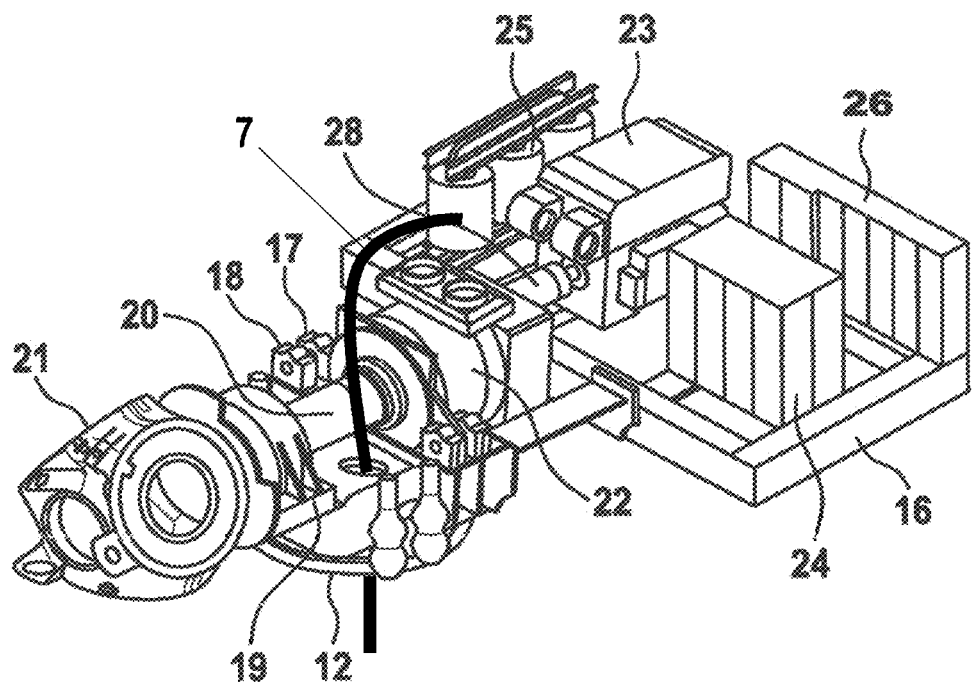
FIG. 2 shows a perspective view of a nacelle component according to aspects of the disclosure, in the assembled state.

A nacelle component shown in FIG. 2, which comprises a power electronics module 16 and a mainframe module 17, is arranged inside the nacelle 14. The mainframe module 17 comprises bearing blocks 18, 19 via which a rotor shaft 20 is rotatably mounted. A rotor hub 21 is connected to the front end of the rotor shaft 20. The rear end of the rotor shaft 20 is connected to the low-speed shaft of the gearbox 22. The mainframe module 17 comprises a slewing ring 12 via which the nacelle 14 is mounted so that it can rotate relative to the tower 15.

The power electronics module 16 carries a generator 23, a converter 24, a transformer 25, and switch cabinets 26. An input shaft 28 of the generator 23 is connected to the high-speed shaft of the gearbox 22. When the rotor shaft 20 rotates, electrical energy is generated by the generator 23. The electrical energy is brought to a medium voltage via the converter 24 and the transformer 25 and fed into a medium-voltage cable 7. The interaction between the generator 23, the converter 24, and the transformer 25 is determined by a control unit which is housed in the switch cabinets 26.

The power electronics module 16 and the mainframe module 17 are connected to each other by bolts. The connection is so stable that the nacelle component can be lifted up as a single unit.

Figure 3:
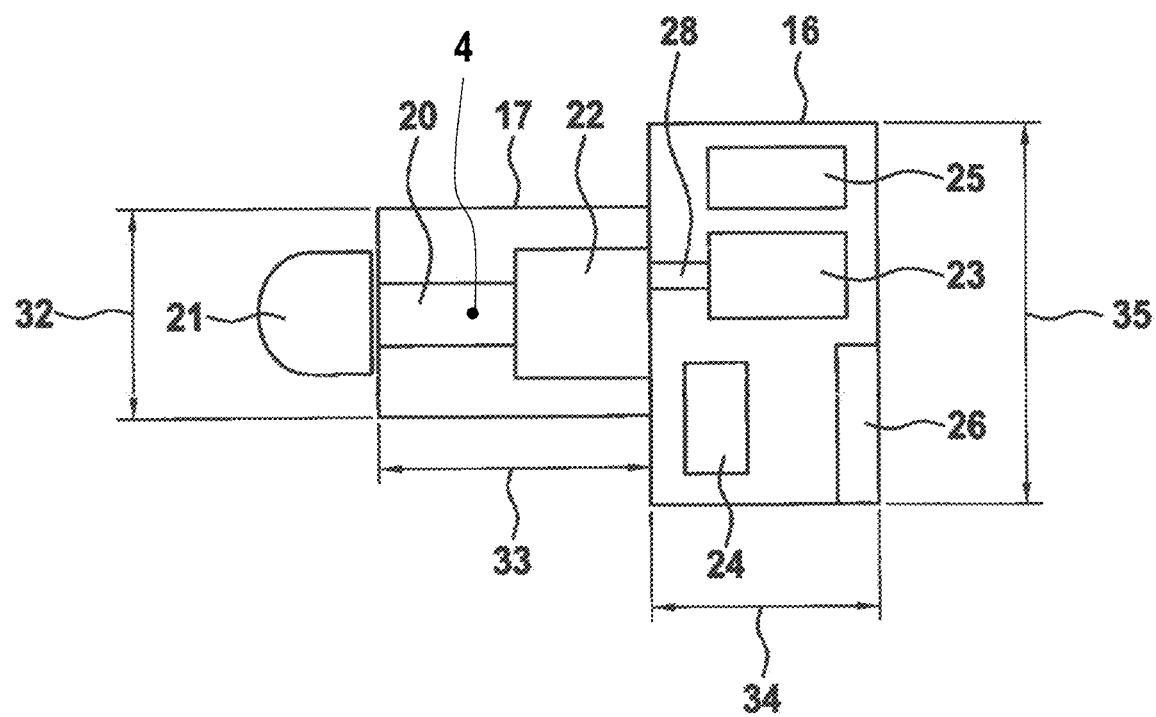
FIG. 3 shows a schematic view from above of a nacelle component according to aspects of the disclosure, in the assembled state.

According to the schematic view in FIG. 3, the mainframe module 17 and the power electronics module 16 each have a rectangular shape when viewed in a horizontal section. The longitudinal extent 33 of the mainframe module 17 extends parallel to the rotor shaft 20, and the transverse extent 32 of the mainframe module 17 extends at right angles to the rotor shaft 20. The transverse extent 34 of the power electronics module 16 is oriented parallel to the rotor shaft 20, and the longitudinal extent 35 of the power electronics module 16 intersects the rotor shaft 20 at right angles.

The generator 23 is arranged slightly out of center in the power electronics module 16. When viewed from the generator 23 in the direction of the input shaft 28, the generator 23 is offset slightly to the right of center. The transformer 25 is likewise arranged in the right half. The converter 24 and the switch cabinets 26 are arranged in the left half of the power electronics module 16.

It is clear from the view in FIG. 3 that the components of the power electronics module 16 are all arranged at a short distance from the nacelle 14 axis of rotation 4. This ensures a favorable load distribution in which the azimuth bearing is subjected to reduced stress.

Figure 4:
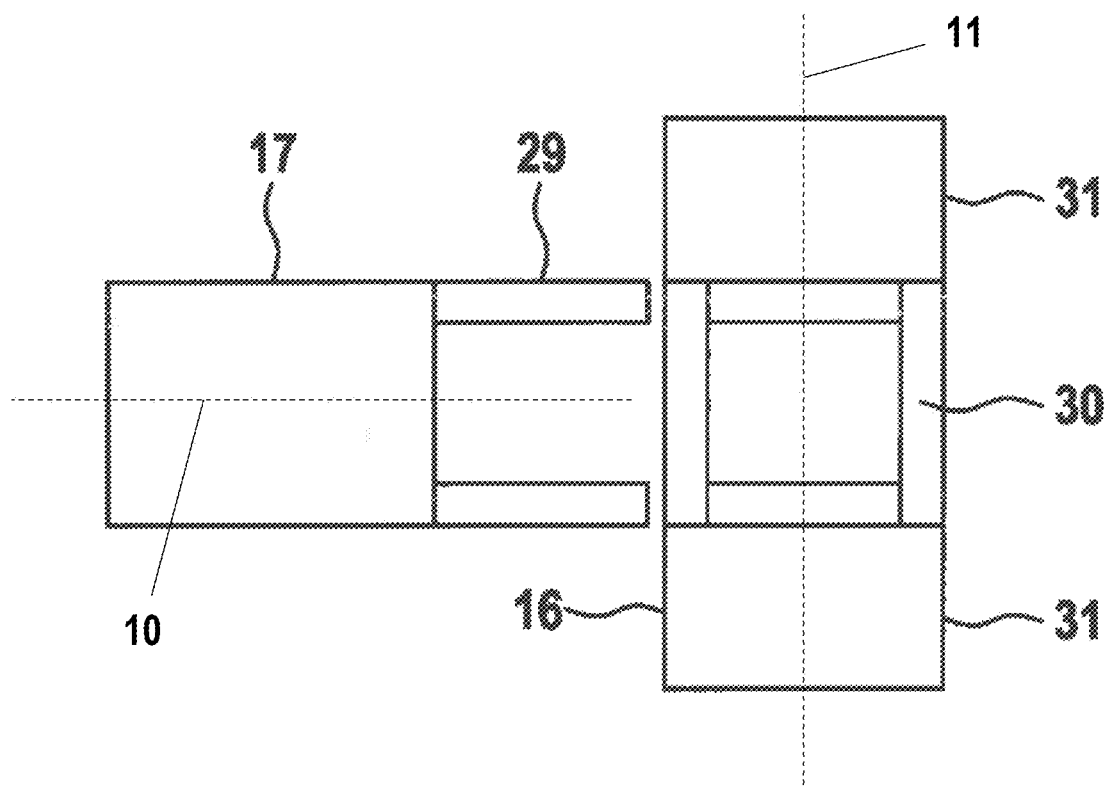
FIG. 4 shows a schematic view from above of a nacelle component according to aspects of the disclosure, in the non-assembled state.

According to FIG. 4, the mainframe module 17 comprises, at its rear end, a frame element 29 which extends lengthwise and has a longitudinal axis 10. The power electronics module 16 comprises a central frame 30 which is arranged in a continuation of the frame element 29 when the power electronics module 16 and the mainframe module 17 are in the connected state. A longitudinal axis 11 of the power electronics module 16 may be perpendicular to the longitudinal axis 10 of the mainframe module 17 when the power electronics module 16 is mounted to the mainframe module 17. The central frame 30 carries the heavy components of the power electronics module 16, in particular the generator 23. Two side frames 31, which carry lighter components of the power electronics module 16, namely the converter 24, the transformer 25, and the switch cabinets 26, adjoin the central frame 30. Both the central frame 30 and the side frames 31 extend over the whole transverse extent of the power electronics module 16. In total, the central frame 30 and the two side frames 31 extend over the whole longitudinal extent of the power electronics module 16.

Figure 14:
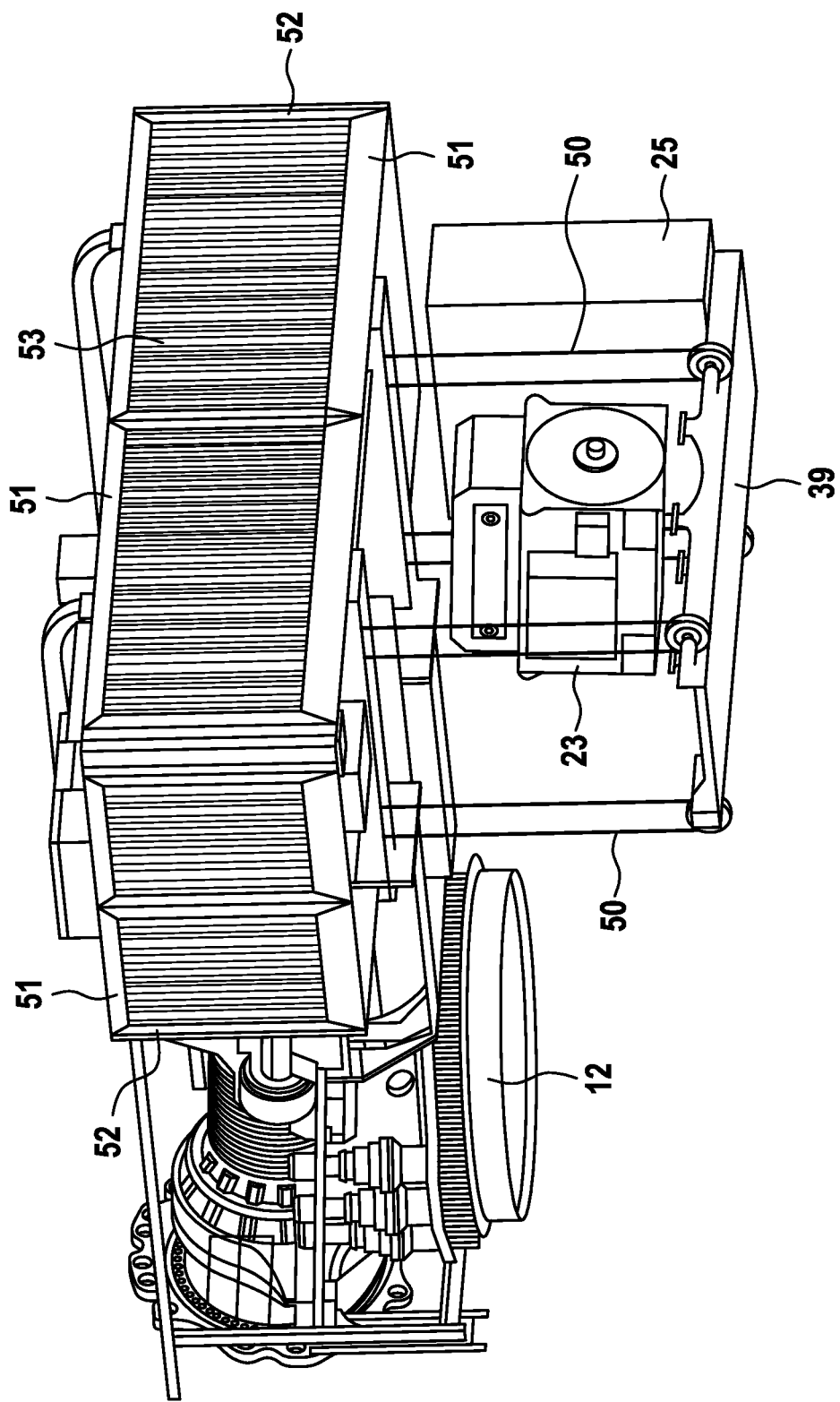
FIG. 14 shows a perspective view of a nacelle component according to the aspects of the disclosure.

In the alternative embodiment as per FIG. 14, a component carrier 39 is provided which bears the generator 23 and the converter 24. When the wind turbine is in operation, the component carrier 39 is screwed to the central frame 30 of the power electronics module 16. For the purposes of maintenance or repair, the component carrier 39 can be detached from the central frame 30 and lowered to the ground by means of cables 50. The cables 50 are driven by means of a winch (not illustrated).

Over the circumference of the power electronics module 16, there extend horizontal frame struts 51 which are connected to one another by vertical frame struts 52. The wall surfaces enclosed between the frame struts 51, 52 are filled by trapezoidal sheets 53 which are self-supporting and which are not supported over the area by a further skeletal frame.

Figure 5:
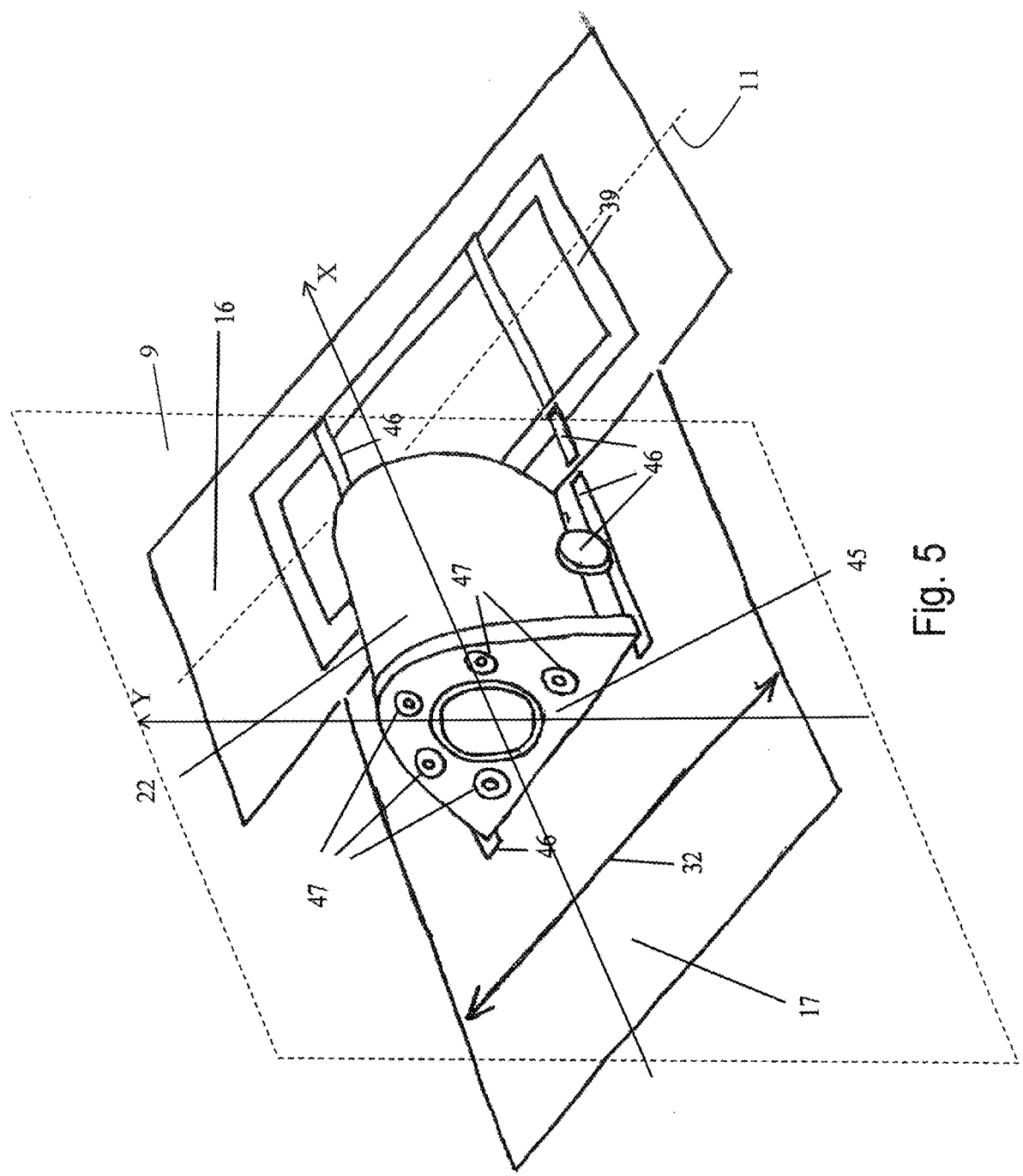
FIG. 5 shows a perspective view of a gearbox, a rail system and a component carrier on the outline of a nacelle component according to aspects of the disclosure.

FIG. 5 shows a gearbox 22 with a gearbox rib 45; the gearbox 22 is suspended by means of suspension elements 47 on the gearbox rib 45. Also shown are the outlines of the mainframe module 17 and of the power electronics module 16; the gearbox rib 45 does not extend over the entire transverse extent 32 of the mainframe module 17. The gearbox 22 can be pulled from the mainframe module 17 into the power electronics module 16 by means of a rail system 46; in the power electronics module 16, the gearbox 22 can be positioned by means of the component carrier 39. Horizontal line X and vertical line Y are included in a vertical plane 9 parallel with a rotational axis of a rotor shaft that is received in the gear box 22.

Figure 6:
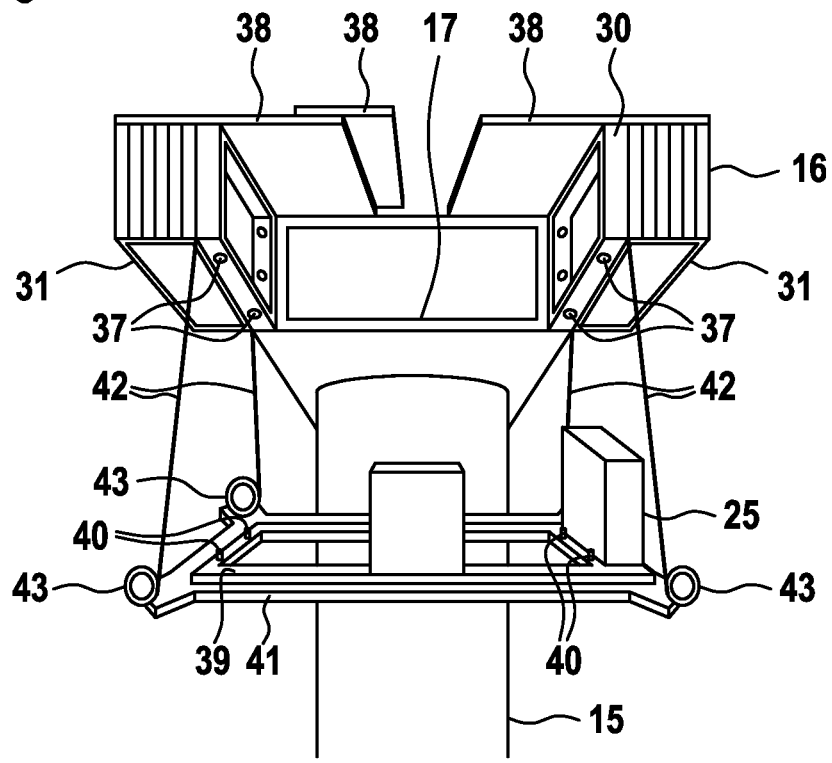
FIG. 6 shows a perspective view of a partially assembled nacelle component on the tower of a wind turbine and elements of the system for the maintenance of the nacelle component.

FIG. 6 shows a perspective view of the wind turbine with a tower 15, a mainframe module 17 and a power electronics module 16. The power electronics module 16 is illustrated in half-open and empty form. The roof 38 of the power electronics module 16 is composed of multiple segments; the central segment has been displaced relative to the outer segments and is opening up an opening. The generator 23 and the transformer 25 rest, in a schematically illustrated manner, on the component carrier 39. The component carrier 39 can be connected by means of four bolts 40 to the central frame 30; for this purpose, the central frame 30 has two openings 37 on each side.

The component carrier 39 rests on a lifting platform 41, wherein the lifting platform 41 is connected by means of cables 42 to the central frame 30 of the power electronics module 16. The lifting platform 41 is part of the system for the maintenance of the nacelle component according to the invention. By means of winches 43 of the lifting platform 41, the free length of the cables 42 can be changed, whereby a vertical movement of the lifting platform 41 is effected. In this way, transportation of the component carrier 39 and of the elements of generator 23 and transformer 25 between the foot of the tower 15 and the power electronics module 16 is made possible.

Figure 7:
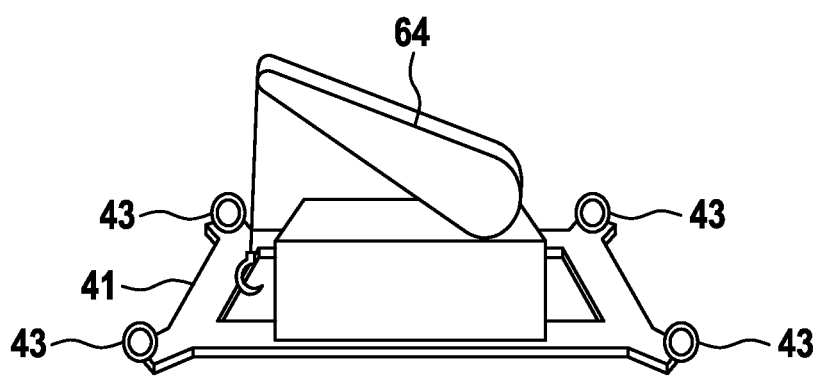
FIG. 7 shows a perspective view of elements of the system for the maintenance of a nacelle component according to aspects of the disclosure.

FIG. 7 shows a lifting platform 41 with winches 43, which lifting platform supports a service crane 44. The component carrier 39 and the crane 44 are elements of the system for the maintenance of a nacelle component according to the invention. The component carrier 39 laden with the service crane 44 can be connected by means of the cables 42 of the winches 43 to the central frame 30 of the power electronics module 16. The component carrier 39 shown in FIG. 7 can, instead of the component carrier 39 shown in FIG. 6, be moved vertically relative to the nacelle component; the service crane 44 shown in FIG. 7 can, instead of the elements of generator 23 and transformer 25 shown in FIG. 6, be transported between the foot of the tower 15 and the nacelle component. If the service crane 44 is connected to the power electronics module 16, it can be utilized for moving heavy components such as the gearbox 22 or the generator 23 within the nacelle. The service crane 44 may however also be utilized for lifting other components of the nacelle, or tools required for the maintenance of the wind turbine, for example from the foot of the tower to the nacelle.

The following procedure can be followed when mounting a wind turbine according to the invention. The mainframe module 17 and the power electronics module 16 can be placed in a pre-mounted state in a manufacturing plant. The mainframe module 17 is then equipped with the rotor shaft 20, the gearbox 22, and the slewing ring 12. The power electronics module 16 is equipped with the generator 23, the converter 24, the transformer 25, and the switch cabinets 26. The generator 23, the converter 24, and the transformer 25 are electrically connected to one another and connected to the control cabinets 26 such that a complete functional test of the components of the power electronics module 16 can be performed as early as in the manufacturing plant.

Transportation from the manufacturing plant to the mounting site can be by road. Both modules 16, 17 have a width of 4 m, a height of no more than 4 m, and a length between 7 m and 10 m. Given these dimensions, road transportation with an acceptable degree of complexity is possible.

At the mounting site, the mainframe module 17 and the power electronics module 16 are connected to each other by bolts, and the input shaft 28 of the generator 23 is connected to the high-speed shaft of the gearbox 22. The nacelle component is then in an assembled state. After attaching further elements such as, for example, a housing, the finished nacelle 14 is raised and placed on the upper end of the tower 15. Depending on the dimensions of the wind turbine and the availability of cranes, it may be more economical for the nacelle to be lifted in individual modules onto the tower and connected there. The individual modules, mainframe module 18 and power electronics module 16, may also be lifted piecewise in elements onto the tower and assembled there. An azimuth bearing is mounted between the nacelle 14 and the tower 15 such that the nacelle 14 can rotate relative to the tower 15. A medium-voltage cable passes from the transformer 25, via the mainframe module 16 and the inside of the tower 15, to the base of the tower and is there connected to a power grid.

Figure 8:
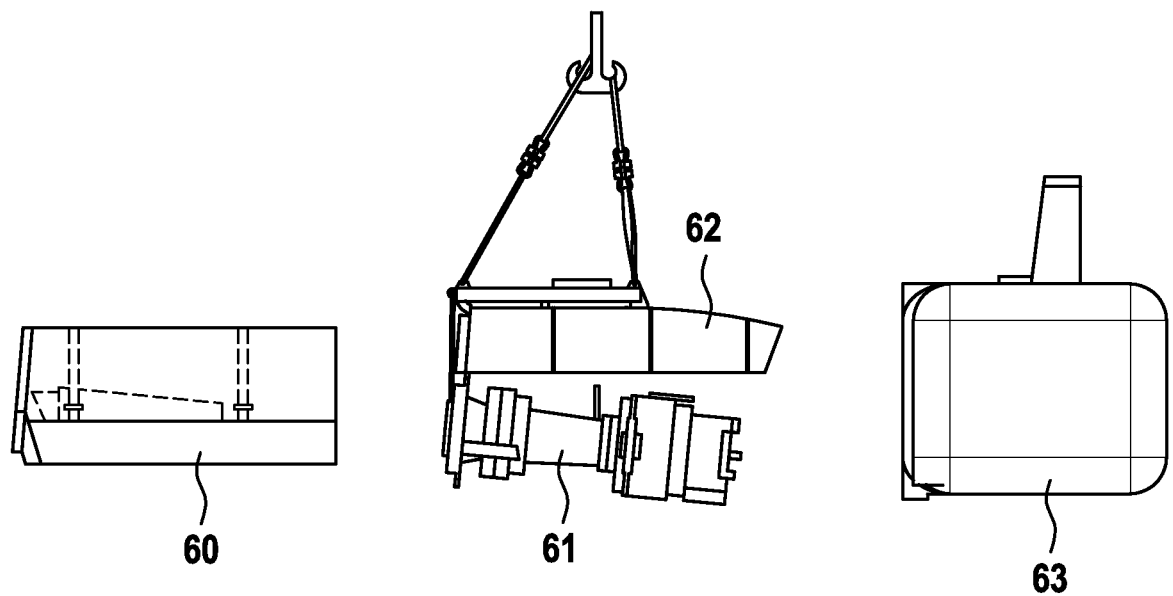
FIGS. 8 to 13 show various erection states of the erection system according to aspects of the disclosure.

As per FIGS. 8 to 13, there are various possibilities as regards the procedure that can be followed in erecting the wind turbine. FIG. 8 shows a first erection state into which the wind turbine components can be brought on the ground. A first transport unit, the mainframe 60 with the side walls of the housing is raised to the upper end of the tower 15. A second transport unit, the drive train 61 with the roof 62 of the housing is raised. A third transport unit, the power electronics module 63 with the electrical components is raised. The rotor is subsequently added as a whole or in components.

Figure 9:
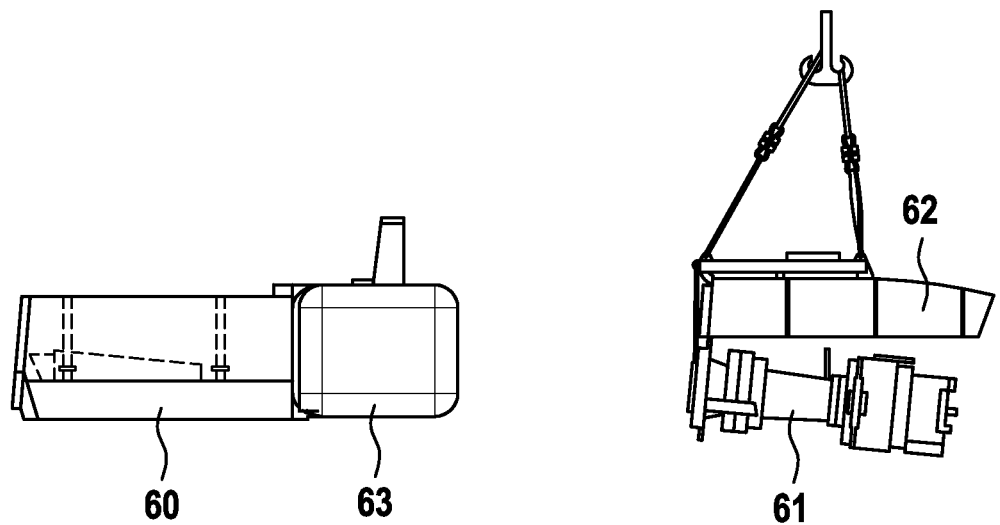

FIG. 9 shows a second erection state into which the wind turbine components can be brought on the ground. The first transport unit is formed by the mainframe 60 with the side walls of the housing and the power electronics module 63. The second transport unit is formed by the drive train 61 with the roof 62 of the housing. The rotor is subsequently added as a whole or in components.

Figure 10:
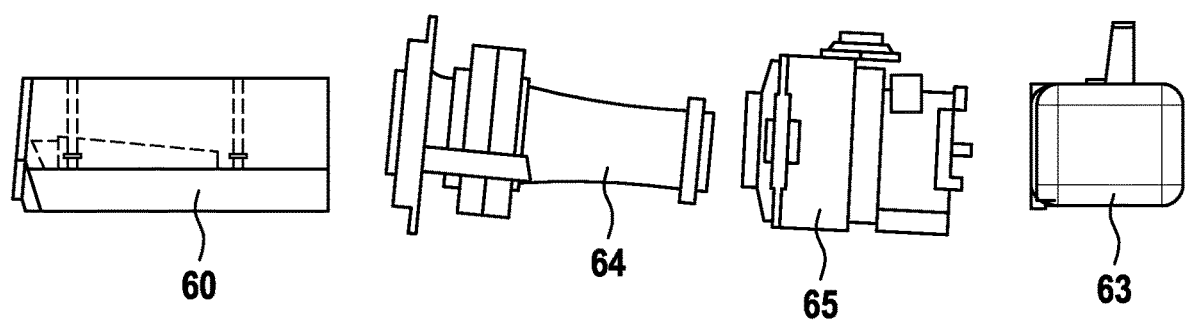

In the third erection state in FIG. 10, the first transport unit is formed by the mainframe 60 with the side walls of the housing. The second transport unit is formed by the major part of the drive train 64 without the gearbox 65. The gearbox 65 forms the third transport unit. The power electronics module 63 forms the fourth transport unit. The rotor is subsequently added as a whole or in components.

Figure 11:
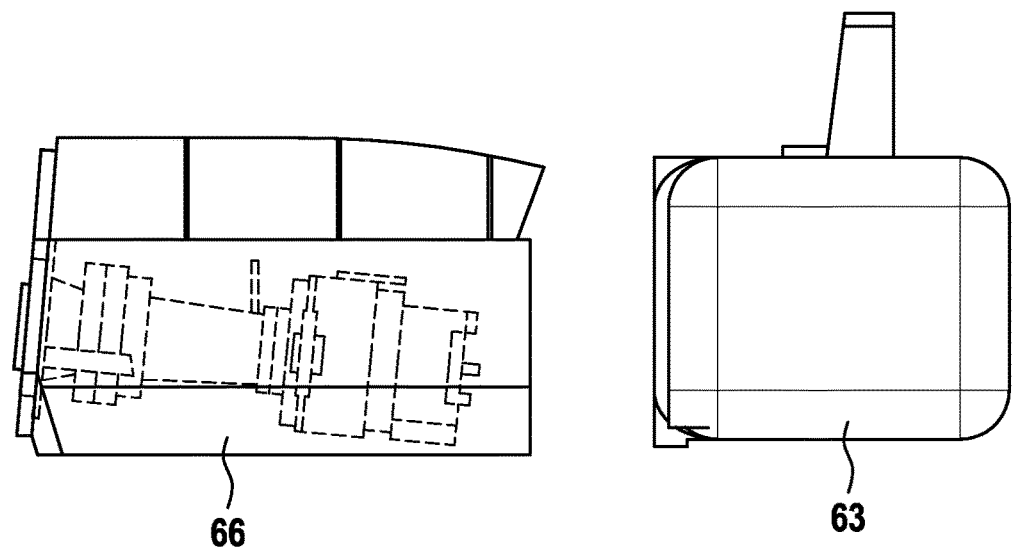

FIG. 11 shows a fourth erection state in which the first transport unit 66 comprises the mainframe 60, the drive train 61 and the housing. The power electronics module 63 forms the second transport unit. The rotor is subsequently added as a whole or in components.

Figure 12:
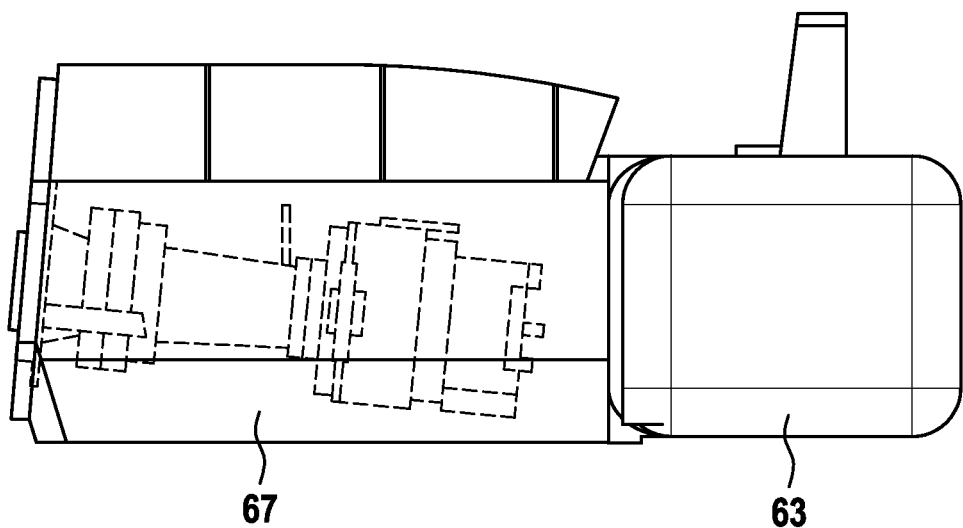

In the fifth erection state as per FIG. 12, the first transport unit 67 comprises the entire nacelle with the mainframe, the drive train, the housing and the power electronics module. The rotor is subsequently added as a whole or in components.

Figure 13:
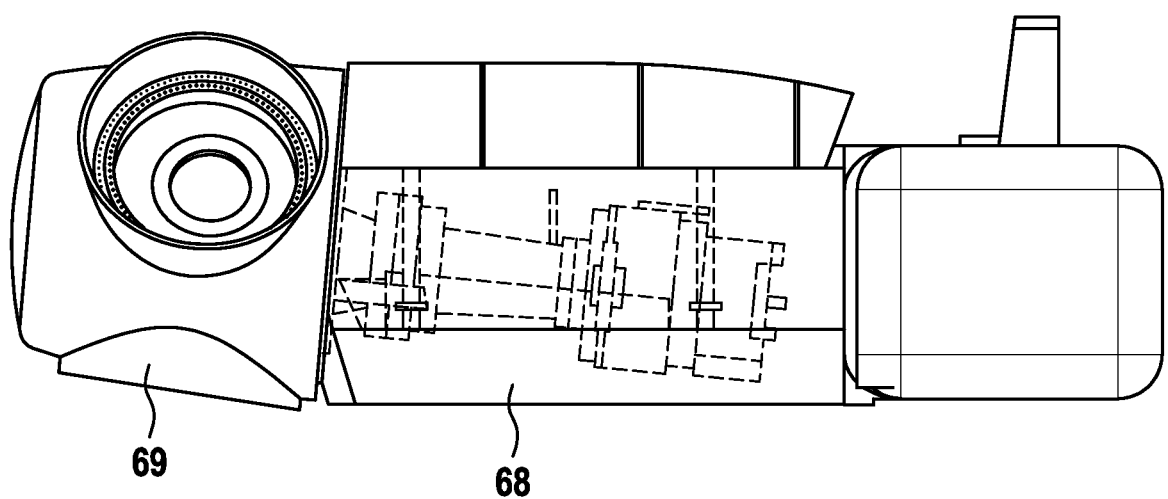

In the sixth erection state as per FIG. 13, the nacelle additionally comprises the rotor hub 69. The rotor blades are successively attached to the rotor hub 69, wherein each of the rotor blades forms a further transport unit.

The invention claimed is:

1. A nacelle component for a nacelle (14) of a wind turbine having a rotor shaft (20) having a rotational axis, said nacelle component comprising:
   a mainframe module (17) having a width (32) and a length (33) greater than said width (32); and
   a power electronics module (16) having a width (34) and a length (35) greater than said width (34), said power electronics module (16) comprising a component carrier (39), the component carrier (39) being removably fastened to a central frame (30) of the power electronics module (16), and the component carrier (39) carrying elements (22, 23, 24, 25, 26) of the power electronics module (16),
   said nacelle component having an assembled state wherein said power electronics module (16) is mounted to said mainframe module (17) with a longitudinal axis (10) of said mainframe module (17) being oriented parallel to the rotational axis of the rotor shaft (20), and wherein a longitudinal axis (11) of said power electronics module (16) intersects with a vertical plane (9) that is parallel to the longitudinal axis (10) of said mainframe module (17),
   wherein in said assembled state of said nacelle component said component carrier (39) is connected to said central frame (30) of said power electronics module (16) and supports at least one element (22, 23, 24, 25, 26) of the power electronics module (16) during operation of the wind turbine, said component carrier (39) configured to detach from said central frame (30) and be lowered to the ground to permit transportation of at least one element (22, 23, 24, 25, 26) between the power electronics module (16) and the ground while said power electronics module (16) remains assembled to said mainframe module (17).

2. The nacelle component of claim 1, wherein the mainframe module (17) comprises a mounting (18, 19) for a rotor shaft (20), a mounting for a gearbox (22) and/or comprises a mounting for a generator (23).

3. The nacelle component of claim 1, wherein the mainframe module (17) comprises a slewing ring (12) which is designed so as to form a rotatable connection between the mainframe module (17) and a tower (15) of a wind turbine.

4. The nacelle component of claim 1, wherein the power electronics module (16) comprises a mounting for a generator (23).

5. The nacelle component of claim 4, wherein the electronics module (16) has transverse ends, a generator (23) is connected to the generator mounting, and an input shaft (28) of the generator (23) is arranged closer to one transverse end than the other of the power electronics module (16).

6. The nacelle component of claim 1, wherein the power electronics module (16) comprises a housing for a converter (24).

7. The nacelle component of claim 1, wherein the power electronics module (16) comprises a mounting for a transformer (25).

8. The nacelle component of claim 1, wherein a medium-voltage cable (7) is connected to the transformer (25) and, in said assembled state of the nacelle component, passes via the mainframe module (17) toward a tower (15) of a wind turbine.

9. The nacelle component of claim 1, wherein the power electronics module comprises a cooling system to cool a generator (23), a converter (24), a transformer (25), and/or a gearbox (22).

10. The nacelle component of claim 1, wherein the power electronics module (16) comprises the central frame (30) which extends only over a part of the length a longitudinal extent (35) of the power electronics module (16), and in that two side frames (31) are attached to the central frame (30).

11. The nacelle component of claim 1, wherein, in a pre-mounted state of the power electronics module (16), a generator (23), a converter (24), a transformer (25), and/or a control unit (26) are installed on the power electronics module (16) and are connected to one another such that a functional test of the components is possible.

12. The nacelle component of claim 1, wherein the width (34) of the power electronics module (16) deviates from the width (32) of the mainframe module (17) by less than 50%.

13. The nacelle component of claim 1, wherein the width (32) of the mainframe module (17) and/or the width a (34) of the power electronics module (16) lie between 2 m and 6 m.

14. The nacelle component of claim 1, wherein said central frame (30) defines a downwardly open aperture and said at least one element (22, 23, 24, 25, 26) supported by said component carrier (39) projects into said aperture when said component carrier (39) is fastened below said central frame (30).

15. The nacelle component of claim 14, wherein said component carrier (39) closes said aperture when said component carrier (39) is fastened below said central frame (30).

16. The nacelle component of claim 1, wherein said component carrier (39) includes lifting devices comprising eyelets, diverting rollers, or winches.

17. The nacelle component of claim 1, wherein said component carrier (39) comprises a lifting platform.

18. A method for mounting a nacelle component of a wind turbine, said method comprising:
- transporting a mainframe module (17) having a width (32) and a length (33) greater than said width (32) to a mounting site, wherein during transportation a longitudinal axis (10) of said mainframe module (17) is oriented parallel to the direction of transport;
- transporting a power electronics module (16) having a width (34) and a length (35) greater than said width (34) to a mounting site, said power electronics module (16) comprising a component carrier (39), the component carrier (39) being removably fastened to a central frame (30) of the power electronics module (16), and the component carrier (39) carrying elements (22, 23, 24, 25, 26) of the power electronics module (16), wherein during transportation a longitudinal axis (11) of said power electronics module 16 is oriented parallel to the direction of transport; and
- connecting the mainframe module (17) and the power electronics module (16) to each other at the mounting site such that said longitudinal axis (11) of said power electronics module (16) intersects with said longitudinal axis (10) of said mainframe module (17),
- raising the mainframe module (17) and the power electronics module (16) to the top of a tower (15) and mounting the mainframe module (17) and power electronics module (16) at the top of the tower, said component carrier (39) configured to detach from said central frame (30) and be lowered to the ground to permit transportation of at least one element (22, 23, 24, 25, 26) between the power electronics module (16) and the ground while said power electronics module (16) remains assembled to said mainframe module (17).

\* \* \* \* \*